UNITED STATES PATENT OFFICE.

ALFRED GORDON SALAMON, OF LONDON, AND PERCY WILLIAMS, OF ROCHESTER, ENGLAND, ASSIGNORS TO THE BRITISH URALITE COMPANY, LIMITED, OF LONDON, ENGLAND.

MANUFACTURE OF REFRACTORY MATERIAL.

SPECIFICATION forming part of Letters Patent No. 735,594, dated August 4, 1903.

Application filed February 12, 1903. Serial No. 143,098. (No specimens.)

*To all whom it may concern:*

Be it known that we, ALFRED GORDON SALAMON, residing at London, and PERCY WILLIAMS, residing at Rochester, Kent, England, subjects of the King of Great Britain, have invented certain new and useful Improvements in the Manufacture of Refractory Material, of which the following is a specification.

This invention has reference to improvements in the manufacture of artificial stone or other refractory material, and more particularly of the material described in the specifications of former Letters Patent, Nos. 631,719, 668,562, 682,140, 686,672, and 689,129. In the manufacture of the material thus described and known to commerce under the name of "uralite" it has been found impossible satisfactorily to eliminate the whole of the monocarbonate of soda which results from the decomposition of silicate of soda by bicarbonate of soda. This residual monocarbonate of soda amounts to about five per cent. if the sheets of artificial stone or other refractory material are subjected to cold washing only, and even if they are subjected to hot washing it is found that the monocarbonate of soda cannot in practice be reduced below about one per cent. This amount prejudicially affects the quality of the resulting material, inasmuch as the monocarbonate of soda is apt to effloresce when the said material is exposed to a damp or moist atmosphere and to appear upon the surface thereof in the form of a white powder. If the surface has previously been painted, the paint is liable to be stripped off or the painted surface may be otherwise injuriously affected by the efflorescence of the monocarbonate of soda. In order, therefore, to produce a useful technical product of this character, it becomes highly necessary to remove the monocarbonate of soda. After experimenting with a number of materials which should be in any case of inorganic composition for the purpose of removing the monocarbonate we have found that the most desirable and satisfactory substance to employ is calcium chlorid in a solution of suitable strength. Our experiments have, however, shown that if the sheet of refractory material be simply immersed in a solution of calcium chlorid the absorption of the solution into the interior of the sheet is insufficient to decompose all the monocarbonate of soda in the sheet and convert it into carbonate of lime and sodium chlorid, as would be the case if the two substances were brought into sufficient contact. Such contact may be effectually obtained and the monocarbonate for industrial purposes completely converted into the respective salts above mentioned by soaking the sheet for some hours in a solution of calcium chlorid (preferably containing about fifteen per cent. of the substance) and then gradually drying the sheet in a stove at a temperature of about 80° centigrade. The duration of the soaking depends on the thickness of the sheet, and we find that for a sheet of seven sixty-fourths of an inch thick the time allowed for soaking should be about two hours. The operation of soaking and of subsequent drying is repeated as often as may be necessary, (depending on the strengths of the bicarbonate and calcium-chlorid solutions,) with the result that the monocarbonate of soda is eliminated from the sheet of artificial stone or other refractory material. Any excess of calcium chlorid remaining in the sheet and of sodium chlorid formed as the result of the decomposition of the monocarbonate of soda may be conveniently removed by subsequent washing.

We find it advantageous in the manufacture of refractory material to proceed as follows—that is to say, after the final bicarbonation the material is soaked in calcium-chlorid solution for two hours, then dried and again soaked in calcium-chlorid solution for another two hours, then dried again and soaked a third time for two hours in the calcium-chlorid solution, and then washed for forty-eight hours and finally dried and hot-stoved.

What we claim is—

1. In a process for the manufacture of refractory substances from material treated with a solution of sodium silicate and with a solution of sodium bicarbonate, the steps of soaking the treated material in a solution of calcium chlorid, and then heating the same, substantially as described.

2. In a process for the manufacture of refractory substances from material treated with a solution of sodium silicate and with a solution of sodium bicarbonate, the steps of soaking the treated material in a solution of calcium chlorid containing about fifteen per cent. of that substance, and then heating the product to a temperature of about 80° centigrade substantially as described.

3. In a process for the manufacture of refractory substances from material treated with a solution of sodium silicate and with a solution of sodium bicarbonate, the steps of repeatedly soaking the treated material in a solution of calcium chlorid containing about fifteen per cent. of that substance, and heating the product after each soaking to a temperature of about 80° centigrade and then finally washing, drying and stoving, substantially as described.

In testimony whereof we have hereunto set our hands in presence of two subscribing witnesses.

ALFRED GORDON SALAMON.
PERCY WILLIAMS.

Witnesses:
H. J. LEWIS,
ERNEST MURRAY GOLDIE.